US011481615B1

(12) United States Patent
Lesea

(10) Patent No.: US 11,481,615 B1
(45) Date of Patent: Oct. 25, 2022

(54) ANTI-SPOOFING OF NEURAL NETWORKS

(71) Applicant: Xilinx, Inc., San Jose, CA (US)

(72) Inventor: Austin H. Lesea, Los Gatos, CA (US)

(73) Assignee: Xilinx, Inc., San Jose, CA (US)

( * ) Notice: Subject to any disclaimer, the term of this patent is extended or adjusted under 35 U.S.C. 154(b) by 1136 days.

(21) Appl. No.: 16/036,631

(22) Filed: Jul. 16, 2018

(51) Int. Cl.
*G06N 3/08* (2006.01)
*G06T 5/10* (2006.01)
*G06N 3/063* (2006.01)

(52) U.S. Cl.
CPC ............... *G06N 3/08* (2013.01); *G06N 3/063* (2013.01); *G06T 5/10* (2013.01); *G06T 2207/20056* (2013.01); *G06T 2207/20081* (2013.01); *G06T 2207/20084* (2013.01)

(58) Field of Classification Search
CPC . G06N 3/08; G06N 3/063; G06T 5/10; G06T 2207/20056; G06T 2207/20081; G06T 2207/20084
See application file for complete search history.

(56) References Cited

U.S. PATENT DOCUMENTS

| | | | | |
|---|---|---|---|---|
| 9,384,404 | B2 * | 7/2016 | Chen | G06V 40/10 |
| 9,875,393 | B2 * | 1/2018 | Morishita | G06V 40/168 |
| 10,068,124 | B2 * | 9/2018 | Bonev | A61B 8/0858 |
| 10,262,188 | B2 * | 4/2019 | Agassy | G06V 40/1306 |
| 2016/0232401 | A1 * | 8/2016 | Hoyos | G06V 40/12 |
| 2018/0041823 | A1 * | 2/2018 | Gaubitch | H04M 3/493 |
| 2018/0146370 | A1 * | 5/2018 | Krishnaswamy | G10L 19/018 |
| 2019/0303639 | A1 * | 10/2019 | He | G06V 40/1394 |

OTHER PUBLICATIONS

Jourabloo, Amin, Yaojie Liu, and Xiaoming Liu. "Face de-spoofing: Anti-spoofing via noise modeling." Proceedings of the European conference on computer vision (ECCV). 2018. (Year: 2018).*
Atoum, Yousef, et al. "Face anti-spoofing using patch and depth-based CNNs." 2017 IEEE International Joint Conference on Biometrics (IJCB). IEEE, 2017. (Year: 2017).*
Yang, Xiao, et al. "Face anti-spoofing: Model matters, so does data." Proceedings of the IEEE/CVF Conference on Computer Vision and Pattern Recognition. 2019. (Year: 2019).*
Yu, Zitong, et al. "Deep learning for face anti-spoofing: A survey." arXiv preprint arXiv:2106.14948 (2021). (Year: 2016).*
Liu, Yaojie, Amin Jourabloo, and Xiaoming Liu. "Learning Deep Models for Face Anti-Spoofing: Binary or Auxiliary Supervision.", https://openaccess.thecvf.com/content_cvpr_2018/CameraReady/0615.pdf, Mar. 2018 (Year: 2018).*

(Continued)

*Primary Examiner* — Andrae S Allison
(74) *Attorney, Agent, or Firm* — Kevin T. Cuenot

(57) ABSTRACT

Anti-spoofing of a deep learning neural network may include receiving, by an artificial neural network implemented in hardware, an image and multi-dimensional spatial frequency data for the image. The artificial neural network is trained using training images and multi-dimensional spatial frequency data for the training images. Using the artificial neural network, a classification for an object in an image is determined based on the image and the multi-dimensional spatial frequency data for the image.

20 Claims, 5 Drawing Sheets

(56) References Cited

OTHER PUBLICATIONS

Hanilçi, Cemal. "Linear prediction residual features for automatic speaker verification anti-spoofing." Multimedia Tools and Applications 77.13 (2018): 16099-16111. (Year: 2018).*

Feng, Litong, et al. "Integration of image quality and motion cues for face anti-spoofing: A neural network approach." Journal of Visual Communication and Image Representation 38 (2016): 451-460. (Year: 2016).*

Nguyen, Anh et al., "Deep Neural Networks are Easily Fooled: High Confidence Predictions for Unrecognizable Images," Proc. of the 2015 IEEE Conference on Computer Vision and Pattern Recognition, Jun. 7, 2015, pp. 427-436, IEEE, Piscataway, New Jersey.

Moosavi-Dezfoolit, Sayed-Mohsen et al., "Universal Adversarial Perturbations," Proc. of the 2017 IEEE Conference on Computer Vision and Pattern Recognition (CVPR), Jul. 21, 2017, pp. 86-94, IEEE, Piscataway, New Jersey.

Nielsen, Michael, "Using Neural Nets to Recognize Handwritten Digits," In Neural Networks and Deep Learning, 2015, Chapter 1, pp. 1-75, Determination Press.

\* cited by examiner

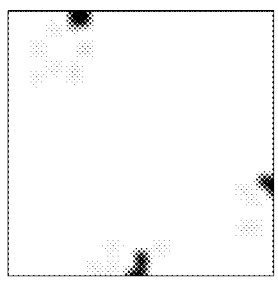
FIG. 4  FIG. 5
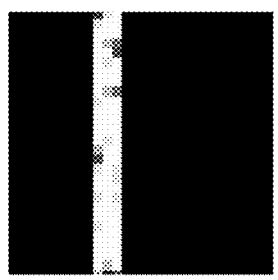
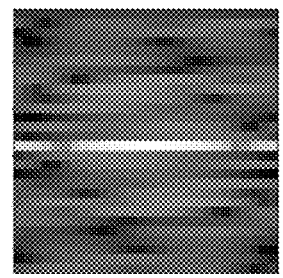
FIG. 6A  FIG. 6B

ANTI-SPOOFING OF NEURAL NETWORKS

TECHNICAL FIELD

This disclosure relates to artificial neural networks and, more particularly, to preventing spoofing of artificial neural networks.

BACKGROUND

Artificial neural networks (hereafter "neural networks") refer to a computational architecture modeled after biological brains. Within a neural network, nodes referred to as neurons may be interconnected and operate collectively to process input data. Examples of different types of neural networks include, but are not limited to, Convolutional Neural Networks, Recurrent Neural Networks, Deep Belief Networks, Restricted Boltzmann Machines, etc. In a feed-forward neural network, the neurons of the neural network have links to other neurons. The links only extend in one direction, i.e., the forward direction, through the neural network.

Neural networks are able to identify features from complex input data to recognize objects from image data. Modern deep learning neural networks are able to achieve a high level of accuracy in recognizing certain objects. Still, there are cases where neural networks mis-recognize objects.

In some cases, neural networks may be induced to mis-recognize an object by modifying existing images. An image that is reliably and correctly perceived by both a neural network and a human being as a particular object may be modified by introducing a perturbation into the image. The perturbation may be introduced intentionally by processing the image through an algorithm. The perturbation in the modified image may be imperceptible or nearly imperceptible to a human being. As such, the human being is still able to correctly recognize the modified image (e.g., as the same object recognized prior to introduction of the perturbation). The neural network, however, reliably recognizes the modified image as a different and incorrect object.

In other cases, an image may contain a version of an object that is simply not the best example of the object. For example, an image of a stop sign in pristine condition may be reliably recognized by both a neural network and a human being. An image of an aged stop sign in poor condition (e.g., one with holes and/or rust spots), though easily recognized by a human being as a stop sign, may be reliably misinterpreted by the neural network as a speed limit sign.

In still other cases, images may be created that induce mis-recognition in neural networks. For example, an image may be created that is completely unrecognizable by human beings. The image appears to a human being as "abstract" and is not interpreted to be any particular object. A neural network, however, may reliably recognize that same image as a particular object.

Each of the examples described above may be used to spoof a neural network. The neural network may be tricked or forced into mis-recognizing a particular object effectively breaking the classification that is performed and disrupting any system in which the neural network is included.

SUMMARY

In one or more embodiments, a method includes receiving, by an artificial neural network implemented in hardware, an image and multi-dimensional spatial frequency data for the image. The artificial neural network is trained using training images and multi-dimensional spatial frequency data for the training images. The method may include determining, using the artificial neural network, a classification for an object in the image based on the image and the multi-dimensional spatial frequency data for the image.

In one or more embodiments, an integrated circuit includes an artificial neural network circuit trained using training images and multi-dimensional spatial frequency data for the training images. The artificial neural network circuit may be configured to initiate operations including receiving an image and multi-dimensional spatial frequency data for the image and determining a classification for an object in the image based on the image and the multi-dimensional spatial frequency data for the image.

In one or more embodiments, a system includes a memory configured to store program code and a processor coupled to the memory. The processor, in response to executing the program code, is configured to implement an artificial neural network trained using training images and multi-dimensional spatial frequency data for the training images. The processor is configured to initiate operations including receiving an image and multi-dimensional spatial frequency data for the image and determining a classification for an object in the image based on the image and the multi-dimensional spatial frequency data for the image.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 4 is an example of a spoofed image.

FIG. 5 is an example of an image.

FIGS. 6A and 6B illustrate an example image and multi-dimensional spatial frequency data for the image.

DETAILED DESCRIPTION

Figure 1:
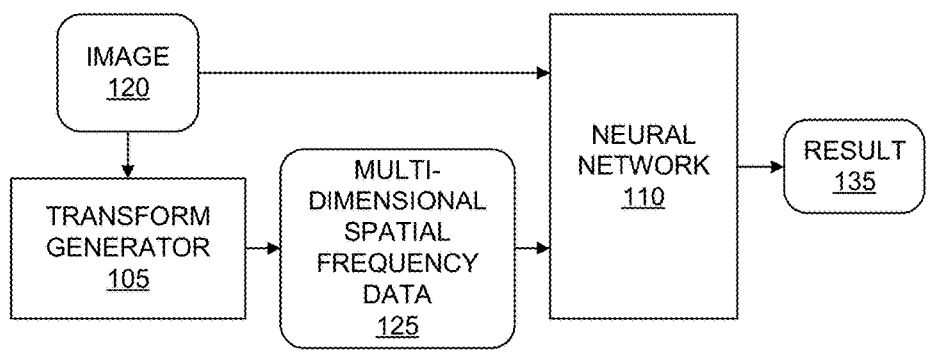
FIG. 1 illustrates an example architecture for a system including a neural network.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to artificial neural networks and, more particularly, to preventing spoofing of artificial neural networks (hereafter "neural networks"). In accordance with the inventive arrangements described within this disclosure, neural networks may be hardened against spoofing by accounting for and/or utilizing multi-dimensional spatial frequency data for images to be processed by the neural network. The multi-dimensional spatial frequency data for an image may be processed in combination with the image itself by the neural network to improve object recognition accuracy in those situations where the neural network otherwise reliably mis-recognizes an object.

The term "neural network" refers to a computational architecture that defines a particular number of neurons and connectivity of the neurons (e.g., the number of layers, connectivity of layers, and number of neurons in each layer), connection weights, and other parameters of the computational architecture. In some cases, the neural network is expressed as a programmatic description or definition that may be executed, e.g., as program code, by a computing system. In other cases, the neural network is implemented in hardware, e.g., as dedicated circuitry.

In one or more embodiments, a neural network is trained using training images and multi-dimensional spatial frequency data for the training images. Subsequently, post training and during operation, the neural network utilizes images and multi-dimensional spatial frequency data for the images to recognize objects within the images. The neural network is capable of reliably and correctly recognizing objects in cases where conventional neural networks and/or image processing techniques that use neural networks unable to do so and/or may be spoofed. Further, when processing images that are reliably recognized by conventional neural networks and/or image processing techniques, use of the inventive arrangements described within this disclosure can increase accuracy in the recognition result.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example architecture 100 for a system including a neural network. In the example of FIG. 1, architecture 100 includes a transform generator 105 and a neural network 110. Transform generator 105 is capable of processing an image and generating multi-dimensional spatial frequency data for the image. Transform generator 105 is capable of receiving an image 120 and processing image 120 to generate multi-dimensional spatial frequency data 125.

Multi-dimensional spatial frequency data specifies a characteristic of image 120 that is periodic across position in space. The multi-dimensional spatial frequency is a measure of how often sinusoidal components of the image repeat per unit of distance within the image. In image-processing applications, spatial frequency may be expressed in units of cycles per millimeter or equivalently line pairs per millimeter in two dimensions (e.g., by determining one-dimensional spatial frequency data across rows of pixels and one-dimensional spatial frequency data across columns of pixels in the image).

Transform generator 105 may be implemented to apply any of a variety of different transforms to received data. The transform may be any orthogonal multi-dimensional spatial frequency transform capturing spatial frequencies in two (or more) dimensions. Examples of transforms that can be used or applied by transform generator 105 include, but are not limited to, Fast Fourier transform (FFT), a Gabor filter, Discrete Cosine transform (DCT), Fractional Fourier transform (FRFT), and Laplace transform. The examples provided are for purposes of illustration and not limitation. Other transforms may be used beyond those disclosed herein.

The term "image" is used throughout this disclosure and refers to any of a variety of different types of image data, whether individual images (files), stereo images, video, and/or stereo video. Accordingly, the following are provided for purposes of illustration and not limitation. In one example, transform generator 105 is capable of receiving image 120 and generating a 2-dimensional FFT (2DFFT) for image 120 as multi-dimensional spatial frequency data 125. In another example, image 120 is a stereo image. In that case, transform generator 105 is capable of generating a 3DFFT for the stereo image as multi-dimensional spatial frequency data 125. In another example, image 120 represents a video. In that case transform generator 105 is capable of generating a 4DFFT for the video over time as multi-dimensional spatial frequency data 125. In still another example, image 120 is a stereo video. In that case, transform generator 105 is capable of generating a 5DFFT for the stereo video over time as multi-dimensional spatial frequency data 125.

In one or more embodiments, multi-dimensional spatial frequency data 125, as generated by transform generator 105, includes both magnitude information and phase information. In one or more other embodiments, multi-dimensional spatial frequency data 125, as generated by transform generator 105, includes only magnitude information. For example, the phase information may be discarded.

In the example of FIG. 1, neural network 110 is configured to receive multiple inputs. In particular, neural network 110 receives image 120 and multi-dimensional spatial frequency data 125 for image 120 as separate inputs. Both image 120 and multi-dimensional spatial frequency data 125 are processed through neural network 110 to generate result 135. Result 135 is a classification of image 120 that recognizes image 120 as, or as including, a particular object. Typically, neural network 110 is capable of outputting a confidence score indicating a level of certainty for result 135.

Since neural network 110 is capable of receiving both image 120 and multi-dimensional spatial frequency data 125, neural network 110 is trained using both images and the respective multi-dimensional spatial frequency data for such images. For example, neural network 110 is be trained to a point where the weights of the neural network (e.g., neurons contained therein) have converged or substantially converged. The training process determines a set of weights that provides neural network 110 with a desired input-output relationship. To this end, the training, or learning, process adjusts the weights of neural network 110 to change the input-output relationship so that an input-output accuracy cost function is optimized. As such, the goal of training is to change the input-output relationship of the neural network.

In one or more embodiments, architecture 100 is implemented using a data processing system. For example, architecture 100 is implemented as a computer system having a processor that is capable of executing program code. The processor, for example, executes program code that implements transform generator 105 and neural network 110.

In one or more other embodiments, architecture 100 is implemented as an integrated circuit (IC) or other device. For example, architecture 100 may be implemented within an Application-Specific IC (ASIC), as a programmable IC, or as another type of IC. An example of a programmable IC is a Field Programmable Gate Array (FPGA) or an IC, e.g., an ASIC, that includes at least some programmable circuitry. When implemented as an IC, transform generator 105 and neural network 110 each is implemented as circuitry (e.g., circuit blocks) within the IC.

Figure 2:
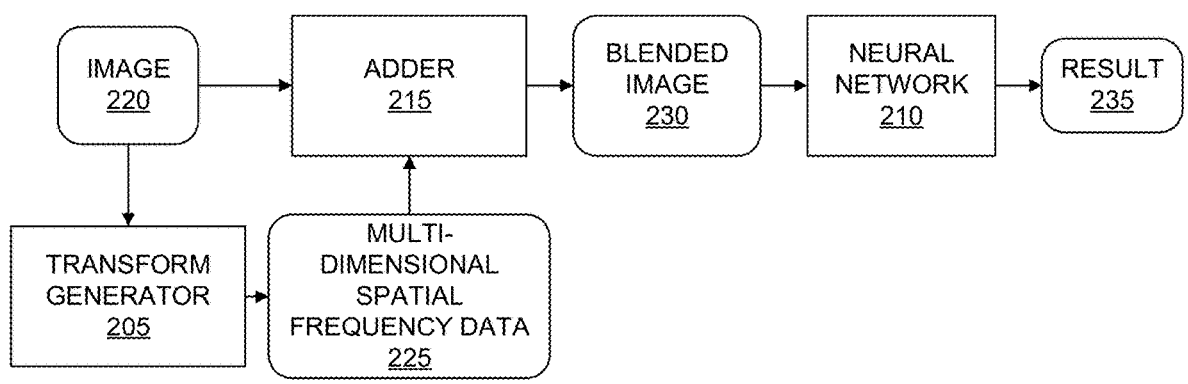
FIG. 2 illustrates another example architecture for a system including a neural network.

FIG. 2 illustrates an example architecture 200 for a system including a neural network. In the example of FIG. 2, architecture 200 includes a transform generator 205, a neural network 210, and an adder 215. Transform generator 205 is capable of processing an image and generating multi-dimensional spatial frequency data for the image. In the example of FIG. 2, transform generator 205 is implemented the same as, or similar to, the transform generator described in connection with FIG. 1. In this regard, image 220 may represent any of a variety of different types of image data including, but not limited to, a single image, a stereo image, a video, or a stereo video. Accordingly, in the example shown, transform generator 205 is capable of receiving an image 220 and processing image 220 to generate multi-dimensional spatial frequency data 225.

Adder 215 is capable of receiving image 220 and multi-dimensional spatial frequency data 225. Adder 215 is capable of adding image 220 with multi-dimensional spatial frequency data 225 to generate blended image 230. In one or more embodiments, adder 215 is capable of adding image 220 with multi-dimensional spatial frequency data 225 so that each of image 220 and multi-dimensional spatial frequency data 225 contributes 50% to blended image 230, e.g., is equally weighted in the summation.

In one or more other embodiments, adder 215 is capable of weighting the contribution of image 220 and/or of multi-dimensional spatial frequency data 225 so that the contribution of each is not equal. For example, in generating blended image 230, adder 215 is capable of generating a 90%-10% blending of image 220 and multi-dimensional spatial frequency data, respectively; an 80%-20% blending; a 70%-30% blending; a 60%-40% blending; a 40%-60% blending; a 30%-70% blending; a 20%-80% blending; a 10%-90% blending; any ratio therebetween; or another ratio.

In the example of FIG. 2, neural network 210 is configured to receive blended image 230 as an input. The example of FIG. 2 illustrates a case where an existing neural network, e.g., a neural network that is not specifically constructed to receive multi-dimensional spatial frequency data and image data as separate inputs, is used without modification. For example, any existing neural network that is configured to receive images for processing is be used as neural network 210 to process blended images so long as that neural network is trained using blended images of the variety described within this disclosure.

Neural network 210 receives blended image 230. In this sense, neural network receives image 220 and spatial frequency data 225, or a version thereof. Neural network 210 processes blended image 230 to generate result 235. Result 235 is a classification of blended image 230 that recognizes blended image 230 as, or as including, a particular object. Typically, neural network 210 is capable of outputting a confidence score indicating a level of certainty of result 235.

In one or more embodiments, architecture 200 is implemented using a data processing system. For example, architecture 200 is implemented as a computer system having a processor that is capable of executing program code. The processor, for example, executes program code that implements transform generator 205, neural network 210, and adder 215.

In one or more other embodiments, architecture 200 is implemented as an IC. For example, architecture 200 may be implemented within an ASIC, as a programmable IC, or as another type of IC. When implemented as an IC, transform generator 205, neural network 210, and adder 215 each may be implemented as circuitry (e.g., circuit blocks) within the IC.

Figure 3:
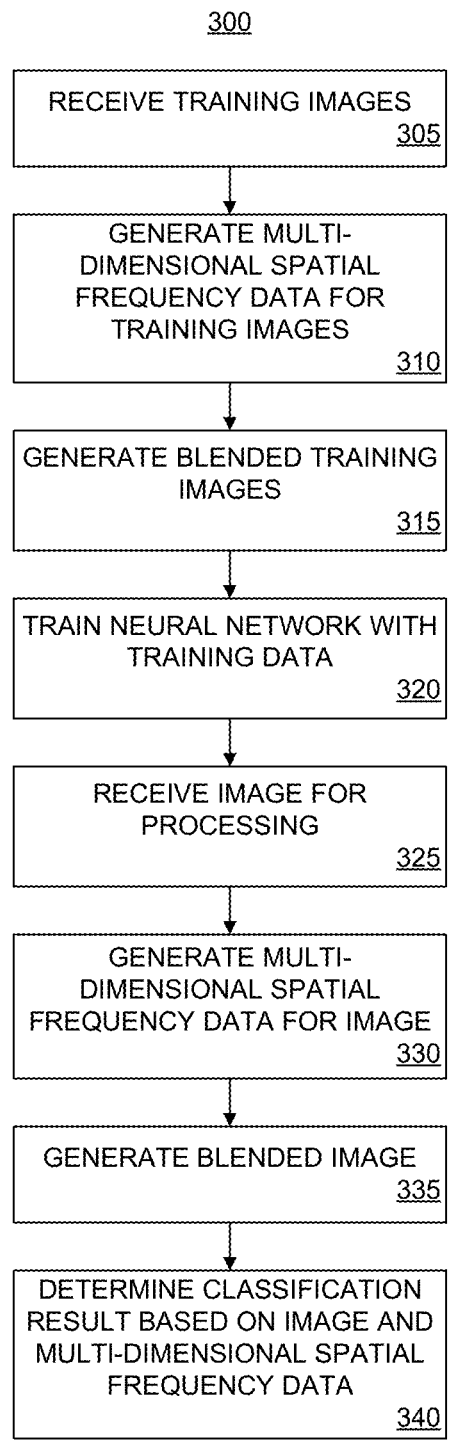
FIG. 3 illustrates an example method of using a neural network with multi-dimensional spatial frequency data.

FIG. 3 illustrates an example method 300 of using a neural network with multi-dimensional spatial frequency data. Method 300 is performed by a hardware system. The hardware system may be implemented as a data processing system that executes program code as described herein or by a device such as an IC as described herein.

In block 305, the system receives one or more training images. For example, the system is capable of receiving a plurality of images from a set of training images. As an illustrative and nonlimiting example, the system may receive approximately 50,000 training images. An example of a set of training images is the Modified National Institute of Standards and Technology (MNIST) database of handwritten digits.

In block 310, the system is capable of generating multi-dimensional spatial frequency data for the training images. For example, the system is capable of running each of the training images through a transform generator to generate multi-dimensional spatial frequency data for each respective training image. The multi-dimensional spatial frequency data for each image may include magnitude information and phase information or just magnitude information.

In block 315, the system optionally generates blended training images. In one or more embodiments, the system is capable of adding each training image with the multi-dimensional spatial frequency data for that training image to generate a blended training image. The system is capable of performing this operation for each of the training images and respective spatial frequency data.

In block 320, the neural network is trained with the training data. In one or more embodiments, the neural network is configured to include separate inputs for training images and for multi-dimensional spatial frequency data as generally described in connection with FIG. 1. In that case, block 315 need not be performed since the neural network is capable of receiving training images and the multi-dimensional spatial frequency data for each training image as separate inputs concurrently.

In one or more other embodiments, the neural network is configured to include one input that receives an image, e.g., a blended image in this case. In such embodiments, the neural network may be a conventional neural network that otherwise processes images without the benefit of multi-dimensional spatial frequency data. In this example, however, the neural network is trained using the blended training images generated in block 315.

As discussed, the blending of the image and multi-dimensional spatial frequency data may be performed through summation. The contribution of the image and the contribution of the multi-dimensional spatial frequency data for the image in generating the blended image may be controlled through weighting. Appreciably, the particular weighting selected for generating blended images for purposes of training may also be used for generating blended images during operation of the neural network post training.

Once the neural network has been trained, the system may begin normal operation. Accordingly, in block 325, the system receives an image for processing. In block 330, the system is capable of generating multi-dimensional spatial frequency data for the image received in block 325. As discussed, the multi-dimensional spatial frequency data may include magnitude information and phase information or just magnitude information. The system uses the same type of multi-dimensional spatial frequency information for received images that was used for purposes of training the neural network. In block 335, the system optionally generates a blended image using the image and the multi-dimensional spatial frequency data generated in block 330. For example, the system is capable of adding the image with the multi-dimensional spatial frequency data for the image to generate a blended image.

In block 340, the system determines a result based on the image and the multi-dimensional spatial frequency data for the image. In one or more embodiments, the neural network is capable of receiving the image and the multi-dimensional spatial frequency data as separate inputs and processing both to determine the result. In one or more other embodiments, the neural network is capable of receiving the blended image as an input and processing the blended image to determine the result.

Within this disclosure, particular embodiments are described that illustrate the generation of multi-dimensional spatial frequency data and/or the generation of blended images. In particular embodiments, these operations may be performed by another system that is coupled to a neural network that operates as described. Thus, the architectures described herein in connection with FIGS. 1 and 2 may be implemented in a distributed manner within multiple different systems and/or devices that are interconnected.

FIG. 4 is an example of a spoofed image. The image of FIG. 4 is a spoofed image that is incorrectly recognized as a "1" by conventional systems. A system or device implemented as described within this disclosure that is capable of using multi-dimensional spatial frequency data for the image shown does not classify the image of FIG. 4 as a "1".

FIG. 5 is an example of an image. The image of FIG. 5 is an example of an image that is correctly recognized as a "0" by conventional systems. A system or device implemented as described within this disclosure that is capable of using multi-dimensional spatial frequency data for the image is also able to correctly recognize the image of FIG. 5 as a "0". In this regard, the embodiments described herein are still able to correctly recognize images that are not incorrectly recognized by conventional systems. Further, as noted, the embodiments described within this disclosure are capable of recognizing objects within images with increased accuracy compared to conventional systems. Using the embodiments described herein, recognition accuracy increases from approximately 95% to approximately 96%.

FIGS. 6A and 6B illustrate an example image and multi-dimensional spatial frequency data for the image. FIG. 6A illustrates an example image of a "1". FIG. 6B illustrates an example of multi-dimensional spatial frequency data generated for the image of FIG. 6A.

Figure 7A:
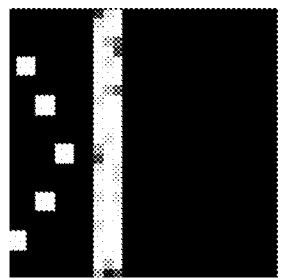
FIGS. 7A and 7B illustrate a further example image and multi-dimensional spatial frequency data for the image.
Figure 7B:
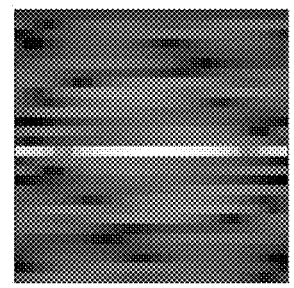

FIGS. 7A and 7B illustrate a further example image and multi-dimensional spatial frequency data for the image. FIG. 7A illustrates an example image of a "1" with additional noise added in the form of white pixels to the left of the "1". FIG. 7B illustrates an example of multi-dimensional spatial frequency data generated for the image of FIG. 7A. FIG. 7B illustrates that despite the addition of noise to the image of FIG. 7A, FIG. 7B is substantially similar to FIG. 6B, which is the multi-dimensional spatial frequency data for the image of "1" without the noise of FIG. 7A.

Figure 8:
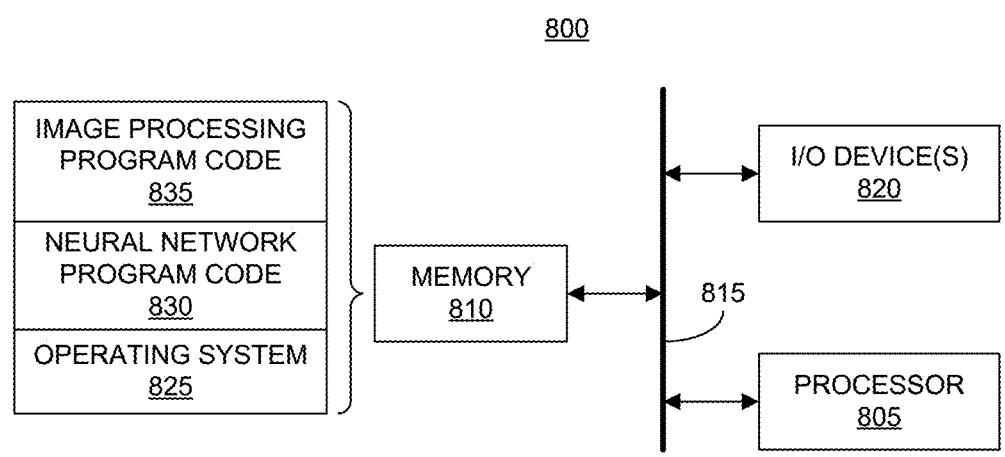
FIG. 8 illustrates an example of a data processing system for use with one or more embodiments described herein.

FIG. 8 illustrates an example system 800 for use with one or more embodiments described herein. System 800 is an example of computer hardware that is used to implement a computer, a server, a portable computer such as a laptop or a tablet computer, a console system, or other data processing system. A system or device implemented using computer hardware is capable of performing the various operations described herein relating to training and/or implementation of a system having a neural network that uses multi-dimensional spatial frequency data.

In the example of FIG. 1, system 800 includes at least one processor 805. Processor 805 is coupled to memory 810 through interface circuitry 815. System 800 is capable of storing computer readable instructions (also referred to as "program code") within memory 810. Memory 810 is an example of computer readable storage media. Processor 805 is capable of executing the program code accessed from memory 810 via interface circuitry 815.

Memory 810 includes one or more physical memory devices such as, for example, a local memory and a bulk storage device. Local memory refers to non-persistent memory device(s) generally used during actual execution of program code. Examples of local memory include random access memory (RAM) and/or any of the various types of RAM that are suitable for use by a processor during execution of program code (e.g., dynamic RAM or "DRAM" or static RAM or "SRAM"). A bulk storage device refers to a persistent data storage device. Examples of bulk storage devices include, but are not limited to, a hard disk drive (HDD), a solid-state drive (SSD), flash memory, a read-only memory (ROM), an erasable programmable read-only memory (EPROM), electrically erasable programmable read-only memory (EEPROM), or other suitable memory. System 800 may also include one or more cache memories (not shown) that provide temporary storage of at least some program code to reduce the number of times program code must be retrieved from a bulk storage device during execution.

Memory 810 is capable of storing program code and/or data. For purposes of illustration, memory 810 stores an operating system 825, neural network program code 830, and image processing program code 835. Neural network program code 830 implements a neural network as described in connection with FIGS. 1 and/or 2. Image processing program code 835 implements a transform generator and/or an adder as described in connection with FIGS. 1 and/or 2.

System 800, e.g., processor 805, is capable of executing operating system 825, neural network program code 830, and/or image processing program code 835 to perform the operations described within this disclosure. As such, operating system 825, neural network program code 830, and image processing program code 835 may be considered an integrated part of system 800. Further, it should be appreciated that any data used, generated, and/or operated upon by system 800 (e.g., processor 805) are functional data structures that impart functionality when employed as part of the system.

Examples of interface circuitry 815 include, but are not limited to, a system bus and an input/output (I/O) bus. Interface circuitry 815 may be implemented using any of a variety of bus architectures. Examples of bus architectures may include, but are not limited to, Enhanced Industry Standard Architecture (EISA) bus, Accelerated Graphics Port (AGP), Video Electronics Standards Association (VESA) local bus, Universal Serial Bus (USB), and Peripheral Component Interconnect Express (PCIe) bus.

System 800 further may include one or more I/O devices 820 coupled to interface circuitry 815. I/O devices 820 may be coupled to system 800, e.g., interface circuitry 815, either directly or through intervening I/O controllers. Examples of I/O devices 820 include, but are not limited to, a keyboard, a display device, a pointing device, one or more communication ports, and a network adapter. A network adapter refers to circuitry that enables system 800 to become coupled to other systems, computer systems, remote printers, and/or remote storage devices through intervening private or public networks. Modems, cable modems, Ethernet cards, and wireless transceivers are examples of different types of network adapters that may be used with system 800.

System 800 may include fewer components than shown or additional components not illustrated in FIG. 8 depending upon the particular type of device and/or system that is implemented. In addition, the particular operating system, application(s), and/or I/O devices included may vary based upon system type. Further, one or more of the illustrative components may be incorporated into, or otherwise form a portion of, another component. For example, a processor may include at least some memory. System 800 may be used to implement a single computer or a plurality of networked or interconnected computers each implemented using the architecture of FIG. 8 or an architecture similar thereto.

Figure 9:
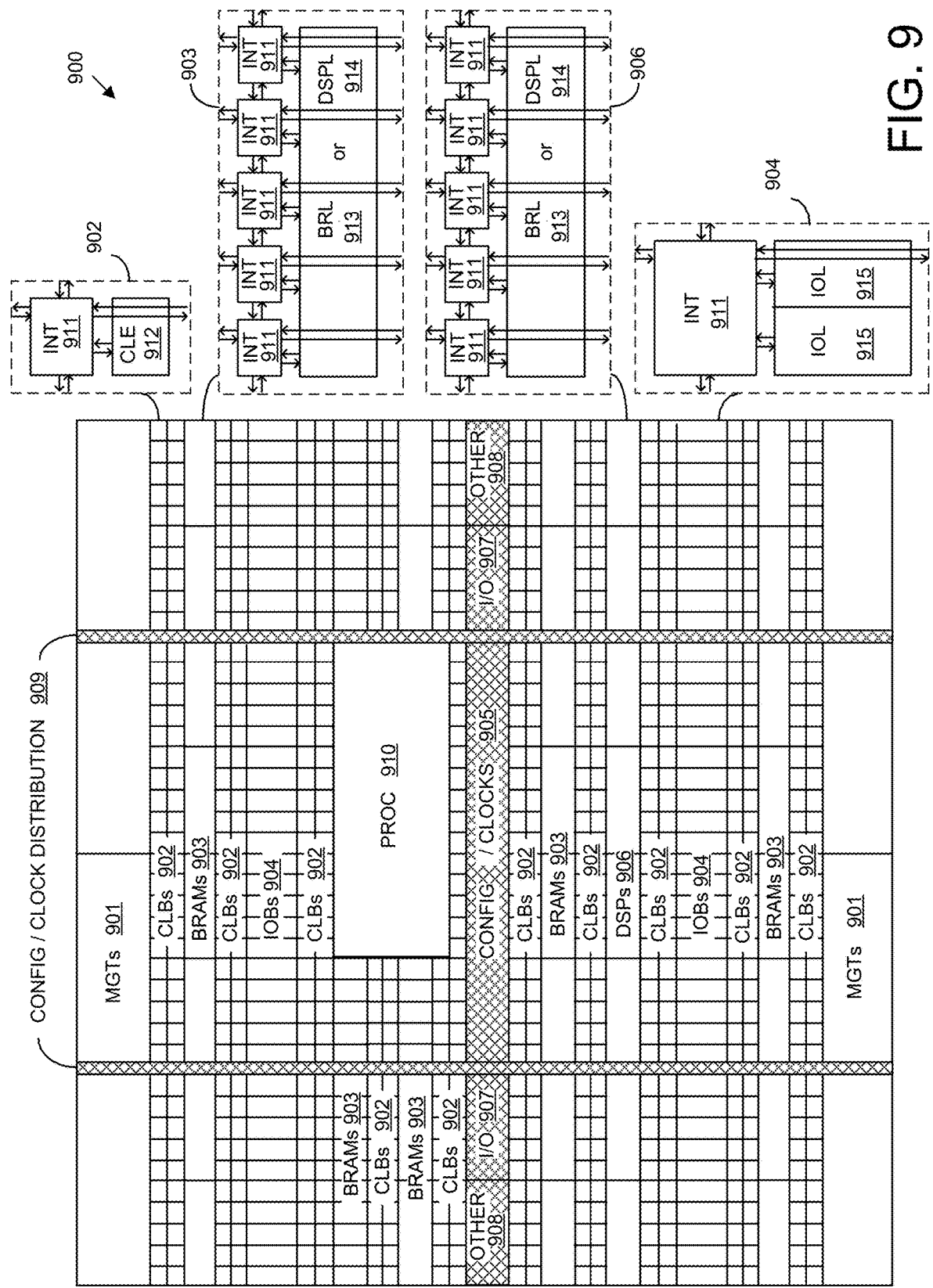
FIG. 9 illustrates an example architecture for an integrated circuit (IC).

FIG. 9 illustrates an example architecture 900 for an IC. In one aspect, architecture 900 may be implemented within a programmable IC. For example, architecture 900 may be used to implement an FPGA. Architecture 900 may also be representative of a system-on-chip (SOC) type of IC. An SOC is an IC that includes a processor that executes program code and one or more other circuits. The other circuits may be implemented as hardwired circuitry, programmable circuitry, and/or a combination thereof. The circuits may operate cooperatively with one another and/or with the processor.

As shown, architecture 900 includes several different types of programmable circuit, e.g., logic, blocks. For example, architecture 900 may include a large number of different programmable tiles including multi-gigabit transceivers (MGTs) 901, configurable logic blocks (CLBs) 902, random access memory blocks (BRAMs) 903, input/output blocks (IOBs) 904, configuration and clocking logic (CONFIG/CLOCKS) 905, digital signal processing blocks (DSPs) 906, specialized I/O blocks 907 (e.g., configuration ports and clock ports), and other programmable logic 908 such as digital clock managers, analog-to-digital converters, system monitoring logic, and so forth.

In some ICs, each programmable tile includes a programmable interconnect element (INT) 911 having standardized connections to and from a corresponding INT 911 in each adjacent tile. Therefore, INTs 911, taken together, implement the programmable interconnect structure for the illustrated IC. Each INT 911 also includes the connections to and from the programmable logic element within the same tile, as shown by the examples included at the top of FIG. 9.

For example, a CLB 902 may include a configurable logic element (CLE) 912 that may be programmed to implement user logic plus a single INT 911. A BRAM 903 may include a BRAM logic element (BRL) 913 in addition to one or more INTs 911. Typically, the number of INTs 911 included in a tile depends on the height of the tile. As pictured, a BRAM tile has the same height as five CLBs, but other numbers (e.g., four) also may be used. A DSP tile 906 may include a DSP logic element (DSPL) 914 in addition to an appropriate number of INTs 911. An IOB 904 may include, for example, two instances of an I/O logic element (IOL) 915 in addition to one instance of an INT 911. The actual I/O pads connected to IOL 915 may not be confined to the area of IOL 915.

In the example pictured in FIG. 9, a columnar area near the center of the die, e.g., formed of regions 905, 907, and 908, may be used for configuration, clock, and other control logic. Horizontal areas 909 extending from this column may be used to distribute the clocks and configuration signals across the breadth of the programmable IC.

Some ICs utilizing the architecture illustrated in FIG. 9 include additional logic blocks that disrupt the regular columnar structure making up a large part of the IC. The additional logic blocks may be programmable blocks and/or dedicated circuitry. For example, a processor block depicted as PROC 910 spans several columns of CLBs and BRAMs.

In one aspect, PROC 910 may be implemented as dedicated circuitry, e.g., as a hardwired processor, that is fabricated as part of the die that implements the programmable circuitry of the IC. PROC 910 may represent any of a variety of different processor types and/or systems ranging in complexity from an individual processor, e.g., a single core capable of executing program code, to an entire processor system having one or more cores, modules, co-processors, interfaces, or the like.

In another aspect, PROC 910 may be omitted from architecture 900 and replaced with one or more of the other varieties of the programmable blocks described. Further, such blocks may be utilized to form a "soft processor" in that the various blocks of programmable circuitry may be used to form a processor that can execute program code as is the case with PROC 910.

The phrase "programmable circuitry" refers to programmable circuit elements within an IC, e.g., the various programmable or configurable circuit blocks or tiles described herein, as well as the interconnect circuitry that selectively couples the various circuit blocks, tiles, and/or elements according to configuration data that is loaded into the IC. For example, circuit blocks shown in FIG. 9 that are external to PROC 910 such as CLBs 902 and BRAMs 903 are considered programmable circuitry of the IC.

In general, the functionality of programmable circuitry is not established until configuration data is loaded into the IC. A set of configuration bits may be used to program programmable circuitry of an IC such as an FPGA. The configuration bit(s) typically are referred to as a "configuration bitstream." In general, programmable circuitry is not operational or functional without first loading a configuration bitstream into the IC. The configuration bitstream effectively implements a particular circuit design within the programmable circuitry. The circuit design specifies, for example, functional aspects of the programmable circuit blocks and physical connectivity among the various programmable circuit blocks.

Circuitry that is "hardwired" or "hardened," i.e., not programmable, is manufactured as part of the IC. Unlike programmable circuitry, hardwired circuitry or circuit blocks are not implemented after the manufacture of the IC through the loading of a configuration bitstream. Hardwired circuitry is generally considered to have dedicated circuit blocks and interconnects, for example, that are functional without first loading a configuration bitstream into the IC, e.g., PROC 910.

In some instances, hardwired circuitry may have one or more operational modes that can be set or selected according to register settings or values stored in one or more memory elements within the IC. The operational modes may be set, for example, through the loading of a configuration bitstream into the IC. Despite this ability, hardwired circuitry is not considered programmable circuitry as the hardwired circuitry is operable and has a particular function when manufactured as part of the IC.

In the case of an SOC, the configuration bitstream may specify the circuitry that is to be implemented within the programmable circuitry and the program code that is to be executed by PROC 910 or a soft processor. In some cases, architecture 900 includes a dedicated configuration processor that loads the configuration bitstream to the appropriate configuration memory and/or processor memory. The dedicated configuration processor does not execute user-specified program code. In other cases, architecture 900 may utilize PROC 910 to receive the configuration bitstream, load the configuration bitstream into appropriate configuration memory, and/or extract program code for execution.

FIG. 9 is intended to illustrate an example architecture that may be used to implement an IC that includes programmable circuitry, e.g., a programmable fabric. For example, the number of logic blocks in a column, the relative width of the columns, the number and order of columns, the types of logic blocks included in the columns, the relative sizes of the logic blocks, and the interconnect/logic implementations included at the top of FIG. 9 are purely illustrative. In an actual IC, for example, more than one adjacent column of CLBs is typically included wherever the CLBs appear, to facilitate the efficient implementation of a user circuit design. The number of adjacent CLB columns, however, may vary with the overall size of the IC. Further, the size and/or positioning of blocks such as PROC 910 within the IC are for purposes of illustration only and are not intended as limitations.

Architecture 900 is capable of implementing a system as described in connection with FIGS. 1 and/or 2. In one or more embodiments, the transform generator, the adder (if included), and/or the neural network are implemented using programmable circuitry such as one or more CLBs 902 and/or one or more DSP blocks 906. In other embodiments, one or more of the transform generator, the adder (if included), and/or the neural network are implemented by PROC 910, while one or more other ones of the transform generator, the adder (if included), and/or the neural network is/are implemented by the programmable circuitry. Still, in some embodiments, PROC 910 is capable of implementing each of the transform generator, the adder (if included), and/or the neural network.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without user intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the terms "one embodiment," "an embodiment," "one or more embodiments," "particular embodiments," or similar language mean that a particular feature, structure, or characteristic described in connection with the embodiment is included in at least one embodiment described within this disclosure. Thus, appearances of the phrases "in one embodiment," "in an embodiment," "in one or more embodiments," "in particular embodiments," and similar language throughout this disclosure may, but do not necessarily, all refer to the same embodiment. The terms "embodiment" and "arrangement" are used interchangeably within this disclosure.

As defined herein, the term "processor" means at least one hardware circuit. The hardware circuit may be configured to carry out instructions contained in program code. The hardware circuit may be an integrated circuit. Examples of a processor include, but are not limited to, a central processing unit (CPU), an array processor, a vector processor, a digital signal processor (DSP), an FPGA, a programmable logic array (PLA), an ASIC, programmable logic circuitry, and a controller.

As defined herein, the term "output" means storing in physical memory elements, e.g., devices, writing to display or other peripheral output device, sending or transmitting to another system, exporting, or the like.

As defined herein, the term "real time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

In one or more embodiments, a method includes receiving, by an artificial neural network implemented in hardware, an image and multi-dimensional spatial frequency data for the image. The artificial neural network is trained using training images and multi-dimensional spatial frequency data for the training images. The method may include determining, using the artificial neural network, a classification for an object in the image based on the image and the multi-dimensional spatial frequency data for the image.

In an aspect, the method includes training the artificial neural network using the training images and the multi-dimensional spatial frequency data for the training images.

In another aspect, the image and the multi-dimensional spatial frequency data for the image are provided to the artificial neural network as a blended image.

In another aspect, the method includes summing the image and the multi-dimensional spatial frequency data for the image to generate the blended image.

In another aspect, the method includes generating, from the image, the multi-dimensional spatial frequency data for the image.

In another aspect, wherein the image and the multi-dimensional spatial frequency data for the image are received by the artificial neural network as separate inputs.

In another aspect, the multi-dimensional spatial frequency data for the image includes magnitude information and phase information.

In another aspect, the multi-dimensional spatial frequency data for the image includes only magnitude information.

In another aspect, the multi-dimensional spatial frequency data for the image is generated using a fast Fourier transform.

In another aspect, the spatial multi-dimensional frequency data for the image is generated using a Gabor filter.

In one or more embodiments, an integrated circuit includes an artificial neural network circuit trained using training images and multi-dimensional spatial frequency data for the training images. The artificial neural network circuit may be configured to initiate operations including receiving an image and multi-dimensional spatial frequency data for the image and determining a classification for an object in the image based on the image and the multi-dimensional spatial frequency data for the image.

In an aspect, the artificial neural network circuit is configured to receive the image and the multi-dimensional spatial frequency data for the image as a blended image.

In another aspect, the integrated circuit includes an adder circuit, coupled to the artificial neural network circuit, and configured to sum the image and the multi-dimensional spatial frequency data for the image to generate a blended image that is provided to the artificial neural network circuit. The determining the classification is performed on the blended image.

In another aspect, the integrated circuit includes a transform circuit, coupled to the artificial neural network circuit, and configured to generate, from the image, the multi-dimensional spatial frequency data for the image.

In another aspect, the image and the multi-dimensional spatial frequency data for the image are received by the artificial neural network circuit as separate inputs.

In another aspect, the multi-dimensional spatial frequency data includes only magnitude information.

In one or more embodiments, a system includes a memory configured to store program code and a processor coupled to the memory. The processor, in response to executing the program code, is configured to implement an artificial neural network trained using training images and multi-dimensional spatial frequency data for the training images. The processor is configured to initiate operations including receiving an image and multi-dimensional spatial frequency data for the image and determining a classification for an object in the image based on the image and the multi-dimensional spatial frequency data for the image.

In an aspect, the processor is configured to receive the image and the multi-dimensional spatial frequency data for the image as a blended image.

In another aspect, the processor is configured to initiate operations further including summing the image and the multi-dimensional spatial frequency data for the image to generate a blended image. The determining the classification is performed on the blended image.

In another aspect, the processor is configured to initiate operations further including generating the multi-dimensional spatial frequency data from the image.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
    receiving, by an artificial neural network implemented in hardware, an image and multi-dimensional spatial frequency data for the image;
    wherein the artificial neural network is trained using training images and multi-dimensional spatial frequency data for the training images; and
    determining, using the artificial neural network, a classification for an object in the image based on the image and the multi-dimensional spatial frequency data for the image.

2. The method of claim 1, further comprising:
    training the artificial neural network using the training images and the multi-dimensional spatial frequency data for the training images.

3. The method of claim 1, wherein the image and the multi-dimensional spatial frequency data for the image are provided to the artificial neural network as a blended image.

4. The method of claim 3, further comprising:
    summing the image and the multi-dimensional spatial frequency data for the image to generate the blended image.

5. The method of claim 1, further comprising:
    generating, from the image, the multi-dimensional spatial frequency data for the image.

6. The method of claim 1, wherein the image and the multi-dimensional spatial frequency data for the image are received by the artificial neural network as separate inputs.

7. The method of claim 1, wherein the multi-dimensional spatial frequency data for the image includes magnitude information and phase information.

8. The method of claim 1, wherein the multi-dimensional spatial frequency data for the image includes only magnitude information.

9. The method of claim 1, wherein the multi-dimensional spatial frequency data for the image is generated using a fast Fourier transform.

10. The method of claim 1, wherein the spatial multi-dimensional frequency data for the image is generated using a Gabor filter.

11. An integrated circuit, comprising:
an artificial neural network circuit trained using training images and multi-dimensional spatial frequency data for the training images, wherein the artificial neural network circuit is configured to initiate operations including:
receiving an image and multi-dimensional spatial frequency data for the image; and
determining a classification for an object in the image based on the image and the multi-dimensional spatial frequency data for the image.

12. The integrated circuit of claim 11, wherein the artificial neural network circuit is configured to receive the image and the multi-dimensional spatial frequency data for the image as a blended image.

13. The integrated circuit of claim 11, further comprising:
an adder circuit, coupled to the artificial neural network circuit, and configured to sum the image and the multi-dimensional spatial frequency data for the image to generate a blended image that is provided to the artificial neural network circuit, wherein the determining the classification is performed on the blended image.

14. The integrated circuit of claim 11, further comprising:
a transform circuit, coupled to the artificial neural network circuit, and configured to generate, from the image, the multi-dimensional spatial frequency data for the image.

15. The integrated circuit of claim 11, wherein the image and the multi-dimensional spatial frequency data for the image are received by the artificial neural network circuit as separate inputs.

16. The integrated circuit of claim 11, wherein the multi-dimensional spatial frequency data includes only magnitude information.

17. A system, comprising:
a memory configured to store program code; and
a processor coupled to the memory, wherein the processor, in response to executing the program code, is configured to implement an artificial neural network trained using training images and multi-dimensional spatial frequency data for the training images, wherein the processor is configured to initiate operations including:
receiving an image and multi-dimensional spatial frequency data for the image; and
determining a classification for an object in the image based on the image and the multi-dimensional spatial frequency data for the image.

18. The system of claim 17, wherein the processor is configured to receive the image and the multi-dimensional spatial frequency data for the image as a blended image.

19. The system of claim 17, wherein the processor is configured to initiate operations further comprising:
summing the image and the multi-dimensional spatial frequency data for the image to generate a blended image, wherein the determining the classification is performed on the blended image.

20. The system of claim 17, wherein the processor is configured to initiate operations further comprising:
generating the multi-dimensional spatial frequency data from the image.

* * * * *